(12) United States Patent
Meehan

(10) Patent No.: US 7,938,322 B2
(45) Date of Patent: *May 10, 2011

(54) RADIO FREQUENCY IDENTIFIERS IN GAME TICKETS

(75) Inventor: Richard Meehan, Wakefield, RI (US)

(73) Assignee: GTech Rhode Island Corporation ( * ) Notice: Subject to any disclaimer, the term of this patent is extended or adjusted under 35 U.S.C. 154(b) by 0 days.

This patent is subject to a terminal disclaimer.

(21) Appl. No.: 12/426,709

(22) Filed: Apr. 20, 2009

(65) Prior Publication Data

US 2009/0206156 A1  Aug. 20, 2009

Related U.S. Application Data

(63) Continuation of application No. 11/387,363, filed on Mar. 22, 2006, now Pat. No. 7,523,861, which is a continuation of application No. 10/392,618, filed on Mar. 19, 2003, now Pat. No. 7,017,805.

(51) Int. Cl.
*G06F 7/08* (2006.01)

(52) U.S. Cl. .............................. 235/381; 463/25; 463/17
(58) Field of Classification Search .................. 235/381; 463/25, 17
See application file for complete search history.

(56) References Cited

U.S. PATENT DOCUMENTS

| 7,017,805 | B2 * | 3/2006 | Meehan ......................... 235/381 |
| 2002/0119817 | A1 * | 8/2002 | Behm et al. ...................... 463/17 |
| 2003/0186739 | A1 * | 10/2003 | Paulsen et al. .................. 463/25 |

* cited by examiner

*Primary Examiner* — Michael G Lee
*Assistant Examiner* — Kristy A Haupt
(74) *Attorney, Agent, or Firm* — Sullivan & Worcester LLP; Christopher T. McWhinney

(57) ABSTRACT

Game ticketing systems and methods provide for the use of radio frequency identifiers (RFIDs). Game tickets such as instant lottery tickets include a substrate having game data and a removable mask covering the game data. A transponder is coupled to the substrate where the transponder stores a ticket RFID that defines a validation code of the game ticket. Game tickets can therefore be dispensed to consumers, validated and tracked using the ticket RFIDs.

13 Claims, 8 Drawing Sheets

RADIO FREQUENCY IDENTIFIERS IN GAME TICKETS

PRIORITY CLAIM AND CROSS-REFERENCE TO A RELATED APPLICATION

This application is a continuation of application Ser. No. 11/387,363 to Meehan filed on Mar. 22, 2006, U.S. Pat. No. 7,523,861, dated Apr. 28, 2009, which is a continuation of application Ser. No. 10/392,618 filed Mar. 19, 2003, U.S. Pat. No. 7,017,805 dated Mar. 28, 2006. This application claims priority to said applications under 35 U.S.C. §120. The entire contents of the original disclosure of said applications is expressly incorporated herein in its entirety by reference thereto.

BACKGROUND

1. Technical Field

Embodiments of the present invention generally relate to gaming systems. More particularly, embodiments relate to the use of ticket radio frequency identifiers (RFIDs) to dispense and validate game tickets.

2. Discussion

Paper-based gaming systems come in a wide variety of formats and are increasing in popularity. Indeed, restaurant franchises often sponsor promotional games in which the consumer peels a mask from the side of a paper cup to determine whether he or she has won a prize, and the use of tickets in state-sponsored lotteries is widespread. For example, many states throughout the U.S. employ future draw or "numbers-type" lottery systems in which the user waits until the winning numbers are announced to determine whether the lottery ticket is a winning ticket, as well as instant lottery systems in which the consumer may determine whether the lottery ticket is a winning ticket immediately upon purchase. Instant lottery systems generally use tickets that contain either "predetermined" game data or "probability" game data. In the case of probability game data, the ticket often has a number of "scratch off" regions and the consumer scratches off a subset of the number of regions in accordance with the rules of the particular game being played. For example, the consumer might scratch off five out of seven regions in order to simulate a hand of poker. Thus, the consumer has a relatively high amount of control over whether or not he or she wins and the lottery sponsor has a somewhat reduced amount of control over the total winnings that must be paid out. Predetermined instant tickets, on the other hand, are given their winning or losing nature at the time of creation. For example, the ticket sponsor may determine in advance how many $100 winning tickets, $20 winning tickets, $1 winning tickets, etc., will be dispensed based on expected sales of the tickets. As a result, the ticket sponsor generally has more control over the total winnings to be paid.

In any case, a traditional gaming system involves dispensing the tickets to consumers and validating the tickets when they are presented for redemption. Typically, game tickets are distributed to game ticket retailers in packs, where the game tickets are activated on a pack-by-pack basis before shipment. Activation involves scanning a bar code located on a pack of lottery tickets. The bar code information for the pack is sent over a network connection to a host computer for tracking purposes. It has been determined that in certain instances, individuals such as ticket retailer employees have engaged in an unlawful activity commonly referred to as "fishing" in which the employee attempts to identify the winning tickets in a pack after activation. Identification can involve a wide variety of techniques ranging from holding the tickets up to a light source to applying carefully selected chemicals to the tickets. Indeed, fishing is a substantial concern with regard to instant tickets having predetermined game data. There is therefore a need for an approach to distributing and dispensing instant lottery tickets that minimizes the risk of fishing and other unlawful activities.

When a game ticket is presented to a game ticket retailer for redemption, the ticket is typically validated by scanning a bar code that is printed on the game ticket, where the bar code defines a validation code for the ticket. Generally, the validation code contains information such as a unique ticket number and batch number associated with the ticket. The bar code information is transmitted to the host computer, where the host computer determines whether the information matches a legitimate winning ticket. If so, the host computer notifies the game ticket retailer that the ticket is valid and may be redeemed. Unfortunately, the use of bar coding in the dispensing and validation processes can have a number of difficulties. For example, bar code scanners are known to have reliability problems, particularly when a portion of the bar code has rubbed off while in the possession of the consumer. Although it is possible to manually enter the bar code data, such an approach can be cumbersome and time consuming. Furthermore, bar code scanning equipment is large and relatively expensive. There is therefore a need for an approach to validating game tickets that is not subject to the shortcomings associated with bar codes.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
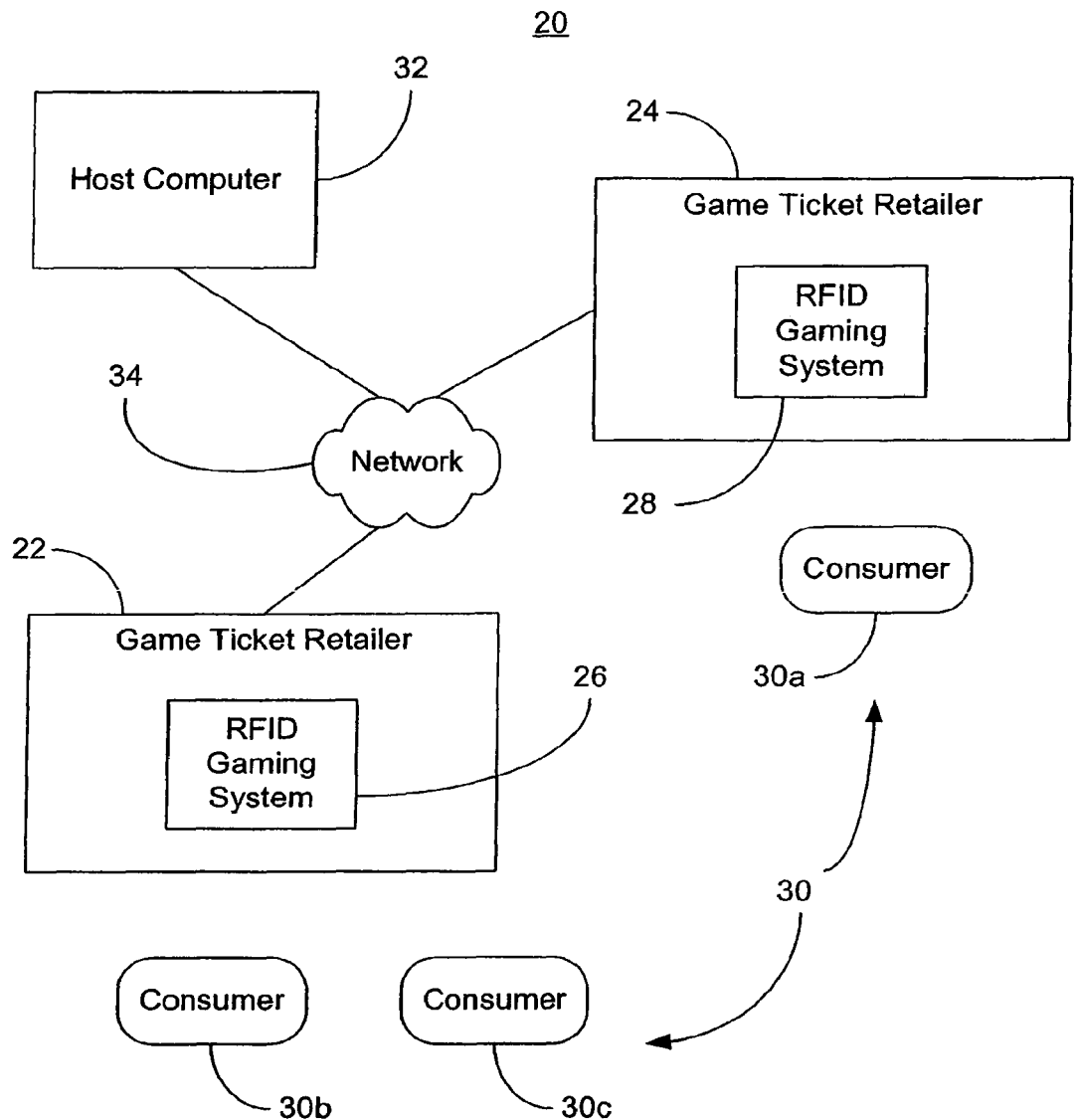
FIG. 1 is a block diagram of an example of a game ticketing architecture according to one embodiment of the invention.

FIG. 1 shows an architecture 20 in which one or more game ticket retailers 22, 24 participate in the dispensing and redemption of game tickets. Each game ticket retailer 22, 24 has a radio frequency identification (RFID) gaming system 26, 28, where retailer employees and/or consumers 30 (30a-30c) may interact with the RFID gaming systems 26, 28 in the process. For example, consumer 30a may use the RFID gaming system 28 to purchase an instant lottery ticket from game ticket retailer 24 and use the RFID gaming system 26 to redeem the lottery ticket at lottery ticket retailer 22. The retailers 22, 24 can communicate with a host computer 32 over a network 34 to implement ticket dispensing as well as ticket validation procedures in a secure manner. As will be discussed in greater detailer, the use of an RFID gaming system 26, 28, rather than conventional bar coding systems enables concerns such as theft, cost and difficulty of use to be substantially obviated.

While certain embodiments will be described with regard to instant lottery ticketing systems, the embodiments of the invention are not so limited. Indeed, architecture 20 can be used in any gaming scenario in which RFID technology may be employed. Notwithstanding, there are a number of aspects of instant lottery ticketing for which architecture 20 is well suited.

Figure 2A:
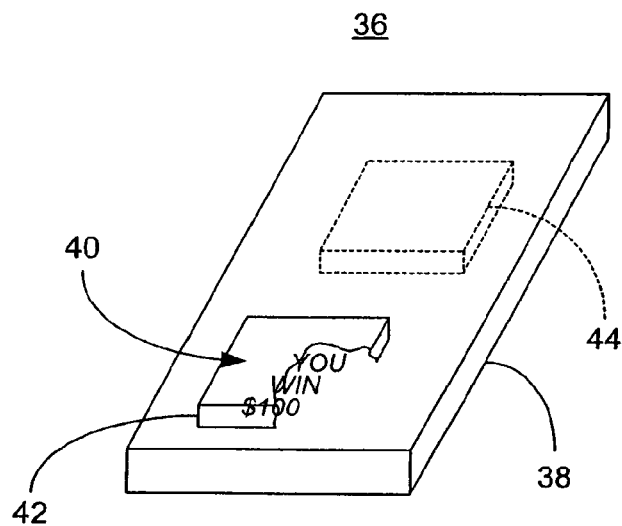
FIGS. 2A and 2B are perspective views of an example of a game ticket according to one embodiment of the invention.
Figure 2B:
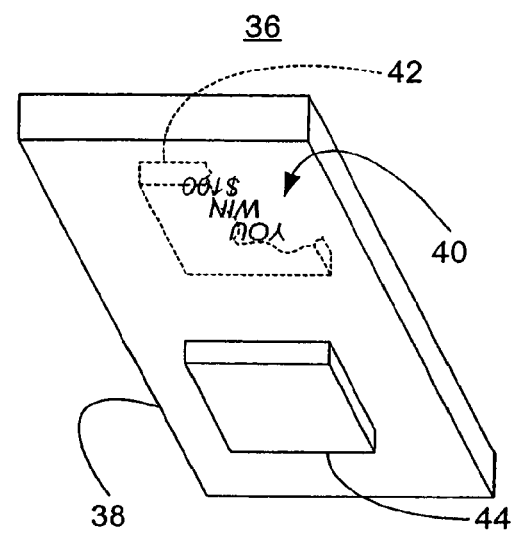

Turning now to FIGS. 2A and 2B, a front side and back side of an instant lottery ticket 36 are shown, respectively. Generally, the lottery ticket 36 has a substrate 38, which includes game data 40 and a removable mask 42 covering the game data 40. The game data 40 may be applied directly to the substrate 38, or may be printed on one or more intervening layers to reduce unlawful tampering with the ticket 36. An example of the use of intervening layers is described in U.S. Pat. No. 5,681,065 to Rua et al. The removable mask is of the "scratch-off" variety of material, which is widely available in industry. One example of such a material is Craigseal product 2580CH manufactured by Craig Adhesives Corp., Newark, N.J. There is also typically a layer of varnish or latex disposed between the game data 40 and the removable mask 42 in order to prevent destruction of the game data 40 when the mask 42 is removed.

Figure 3:
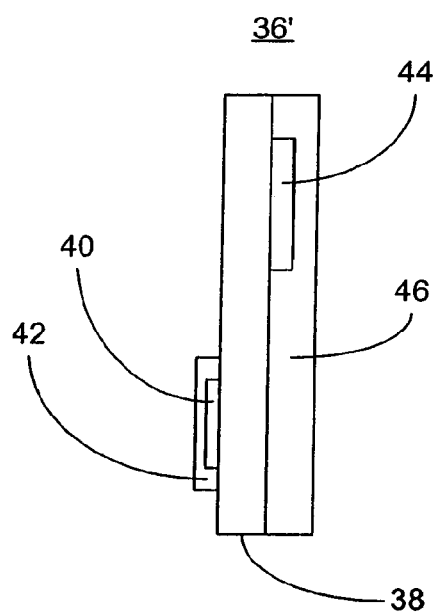
FIG. 3 is a side view of an example of a game ticket according to one embodiment of the invention.

The lottery ticket 36 also has a transponder 44 coupled to the substrate 38, where the transponder 44 stores a ticket RFID that defines a validation code of the lottery ticket 36. The term "coupled" is used herein to define electrical, mechanical, or any other type of connection between components. Such a connection can be made by adhesives, thermal fusion, particle deposition, or any other commercially, available technique. By using the ticket RFID to store the validation code, the lottery ticket 36 is given significantly more functionality than available under conventional techniques. For example, ticket-by-ticket activation and accountability can be achieved when the ticket 36 is dispensed, and faster and less expensive validation is possible when the ticket 36 is redeemed. FIG. 3 shows a ticket 36' having a protective layer 46 covering the transponder 44, where the protective layer 46 may include any suitable material such as lamination or other type of plastic.

Figure 9:
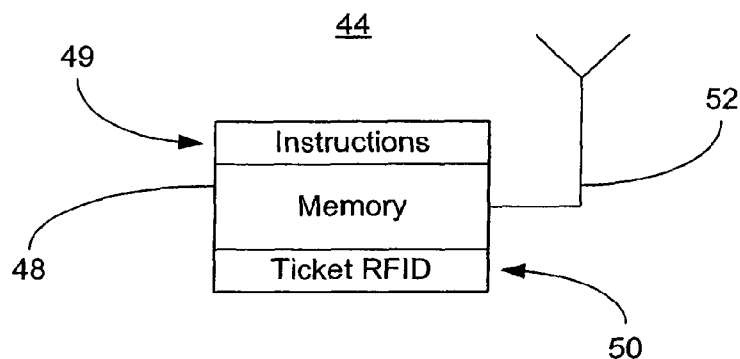
FIG. 9 is a block diagram of an example of a game ticket transponder according to one embodiment of the invention.

FIG. 9 shows one approach to the transponder 44 in greater detail. It can be seen that the transponder 44 includes a memory 48 such as a read-only memory (ROM), which stores the ticket RFID 50. An antenna 52 is coupled to the memory 48, where the antenna 52 can receive an RF excitation signal and transmit the ticket RFID 50. In this regard, it should be noted that memory 48 also includes instructions 49 for detecting the RF excitation signal and causing the antenna 52 to transmit the ticket RFID 50.

Figure 10A:
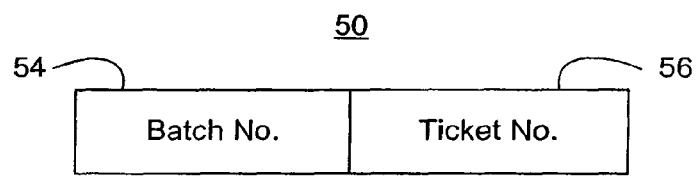
FIG. 10A is a diagram of an example of a ticket RFID according to one embodiment of the invention.

FIG. 10A shows one approach to the validation code that is defined by the ticket RFID 50 in greater detail. Specifically, the validation code includes a batch number 54 and a ticket number 56 corresponding to the lottery ticket 36 (FIGS. 2A and 2B). While the format of the validation code may vary, one approach is to allocate eight bits to the batch number and eight bits to the ticket number, where the validation code is a 16-bit value. In such a case, the 16-bit validation code is modulated onto the antenna 52 as ticket RFID 50. Thus, the RFID lottery system 26, 28 (FIG. 1) is able to uniquely identify each lottery ticket before it is dispensed, activate the lottery ticket based on the identification, uniquely identify the ticket when it is presented for redemption and authorize redemption based on the identification.

Figure 10B:
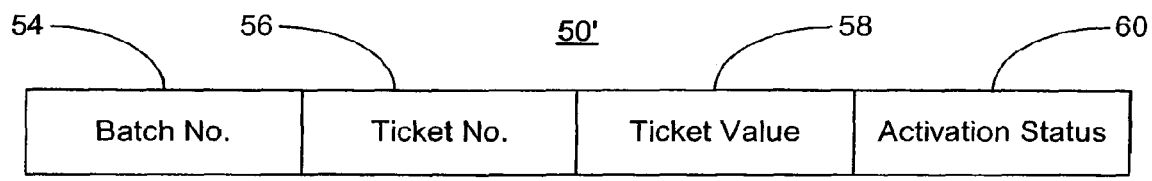
FIG. 10B is a diagram of an example of a ticket RFID according to an alternative embodiment of the invention.

FIG. 10B shows an alternative ticket RFID 50' in which the validation code defined by the ticket RFID 50' further includes a ticket value 58 and activation status 60. In this case, the transponder 44 (FIG. 9) could include programmable memory such as electrically erasable programmable read only memory (EEPROM), where the RFID lottery system 26, 28 (FIG. 1) writes the ticket value 58 and activation status 60 to the transponder memory upon activation of the lottery ticket. Such an approach enables the RFID lottery system to perform the validation locally, without the need to communicate with the host computer 32 (FIG. 1). Localized validation is discussed in greater detail below.

Figures 4, 6:
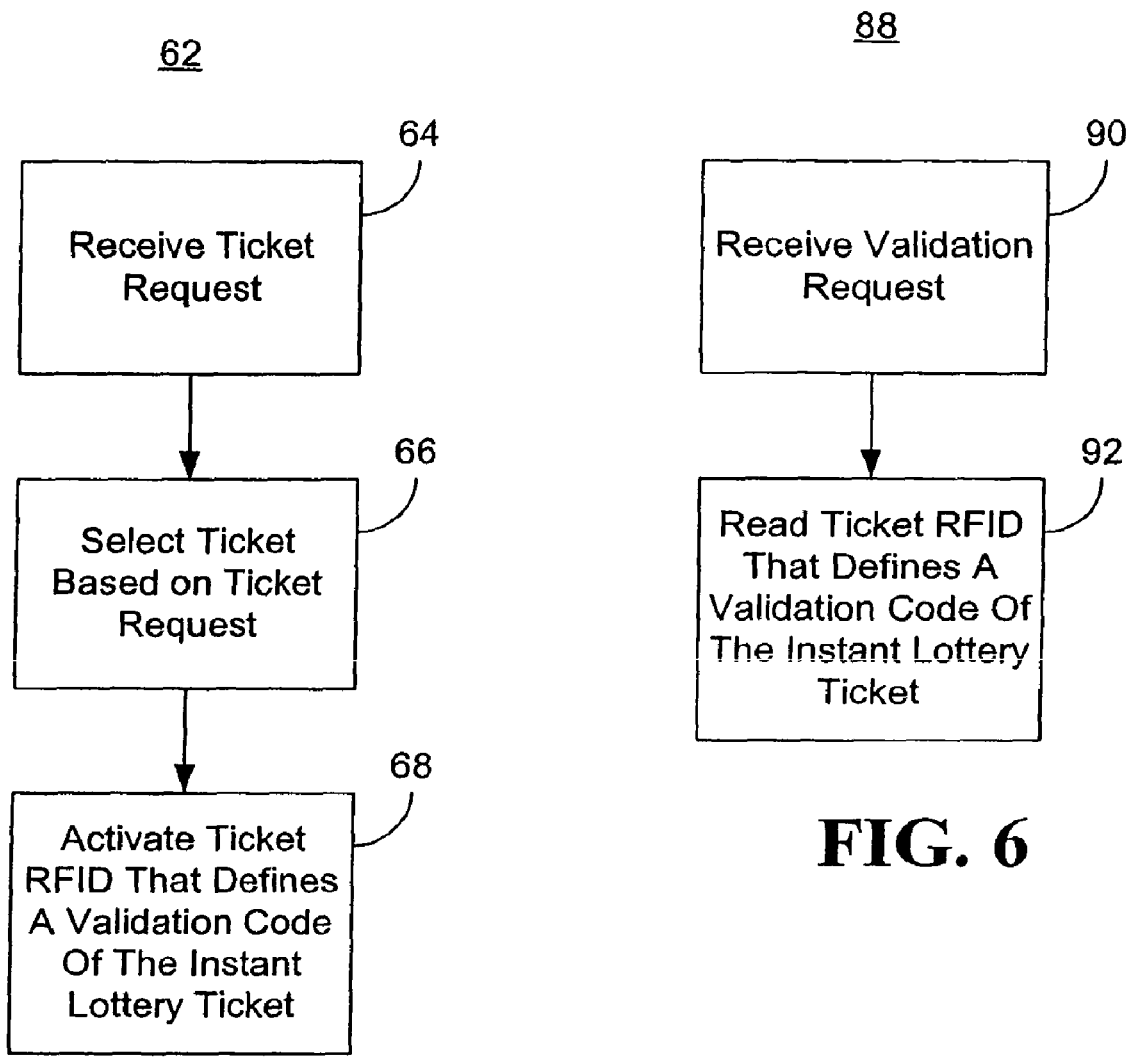
FIG. 4 is a flowchart of an example of a method of dispensing game tickets to consumers according to one embodiment of the invention.
FIG. 6 is a flowchart of an example of a method of validating game tickets according to one embodiment of the invention.

Turning now to FIG. 4, a method 62 of dispensing game tickets to consumers is shown. The method 62 can be implemented in an RFID gaming system 26, 28 (FIG. 1) as a set of instructions capable of being executed by a processor to achieve ticket dispensing. The instructions can be written using any number of well-known software programming techniques and can be stored in a wide variety of machine-readable media such EEPROM, compact disk ROM (CDROM), dynamic random access memory (DRAM), etc. Generally, processing block 64 provides for receiving a ticket request and block 66 provides for selecting a game ticket based on the ticket request. The game ticket can be associated with a promotional game or with a lottery such as a future draw lottery or instant lottery. The ticket request can be input by a consumer or retailer employee via any suitable interface such as a traditional keyboard, touch screen, etc. If various types of game tickets are available, block 66 can provide for identification of the selected type, and if only one type of game ticket is available, block 66 can merely identify the next ticket to be dispensed. The game ticket is activated at block 68 based on a ticket RFID that defines a validation code of the game ticket. It should be noted that activation of the particular ticket rather than the pack from which the ticket came significantly reduces the opportunity for "fishing" or other unlawful activity. Furthermore, the use of RFID technology provides for less expensive and less complicated equipment than available under conventional approaches.

Figure 5A:
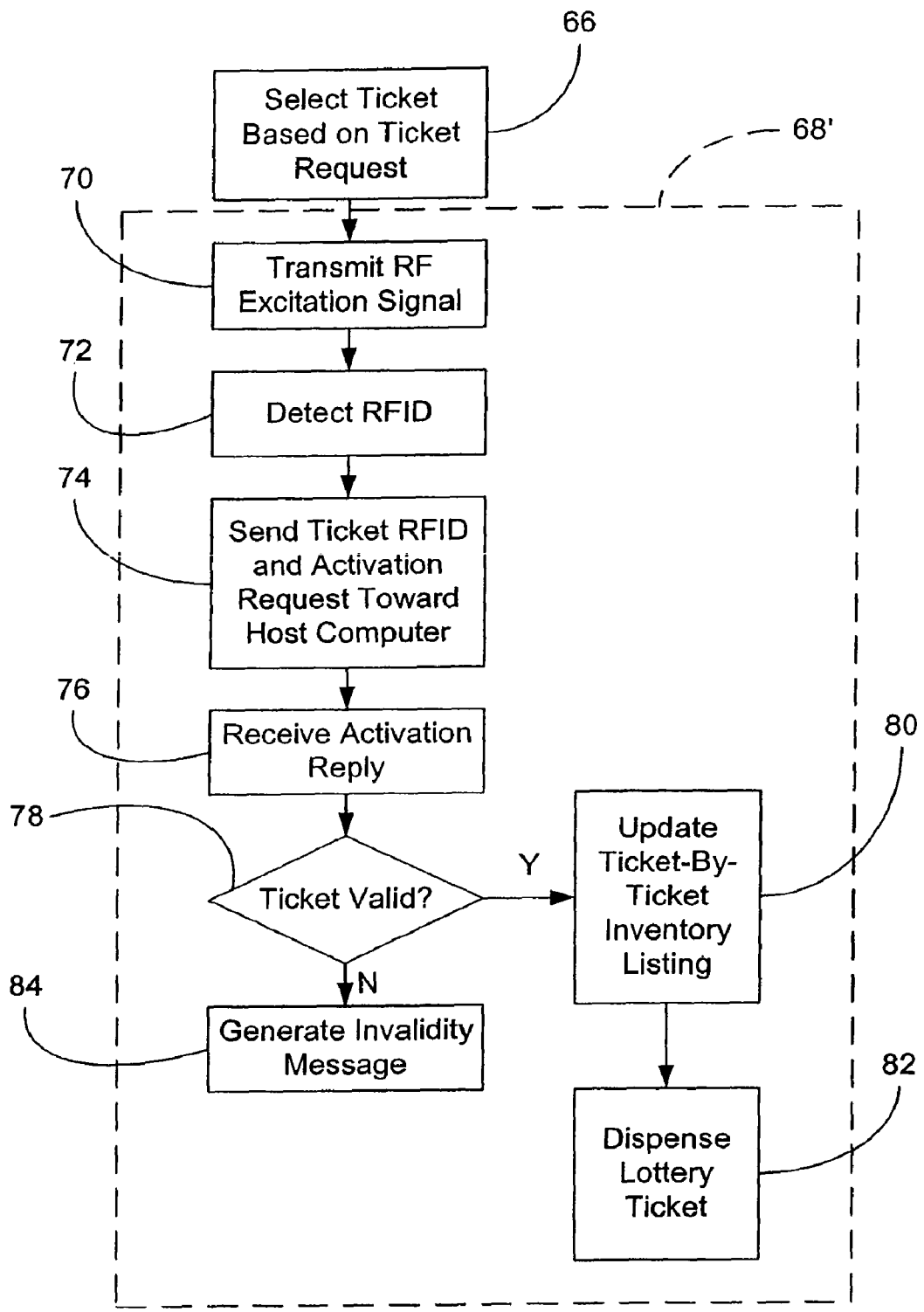
FIG. 5A is a flowchart of an example of a process of activating a ticket RFID according to one embodiment of the invention.

FIG. 5A shows one approach to activating a game ticket based on a ticket RFID in greater detail at processing block 68'. Specifically, an RF excitation signal is transmitted at block 70, where the excitation signal causes the game ticket to transmit the ticket RFID. The transmitted RFID is detected at block 72, and block 74 provides for sending information contained in the ticket RFID and an activation request toward the host computer. An activation reply is received at block 76, where a determination is made at block 78 as to whether the ticket is valid based on the activation reply. If the game ticket is valid, it may be activated. Thus, if the activation reply indicates that the game ticket is valid, a ticket-by-ticket inventory listing is updated at block 80 and the game ticket is dispensed at block 82. The ticket-by-ticket inventory listing can be maintained in a memory of the RFID gaming system and organized into any appropriate data structure such as a relational database. Block 82 may also involve deactivating a door alarm of the game ticket retailer 22, 24 (FIG. 1) premises with regard to the specific game ticket in order to reduce the likelihood of theft even further. If the activation reply indicates that the game ticket is invalid, block 84 provides for generating an invalidity message such as "Activation Not Authorized." The invalidity message can be associated with an appropriate signal to prevent the ticket dispenser from releasing the selected game ticket.

Figure 5B:
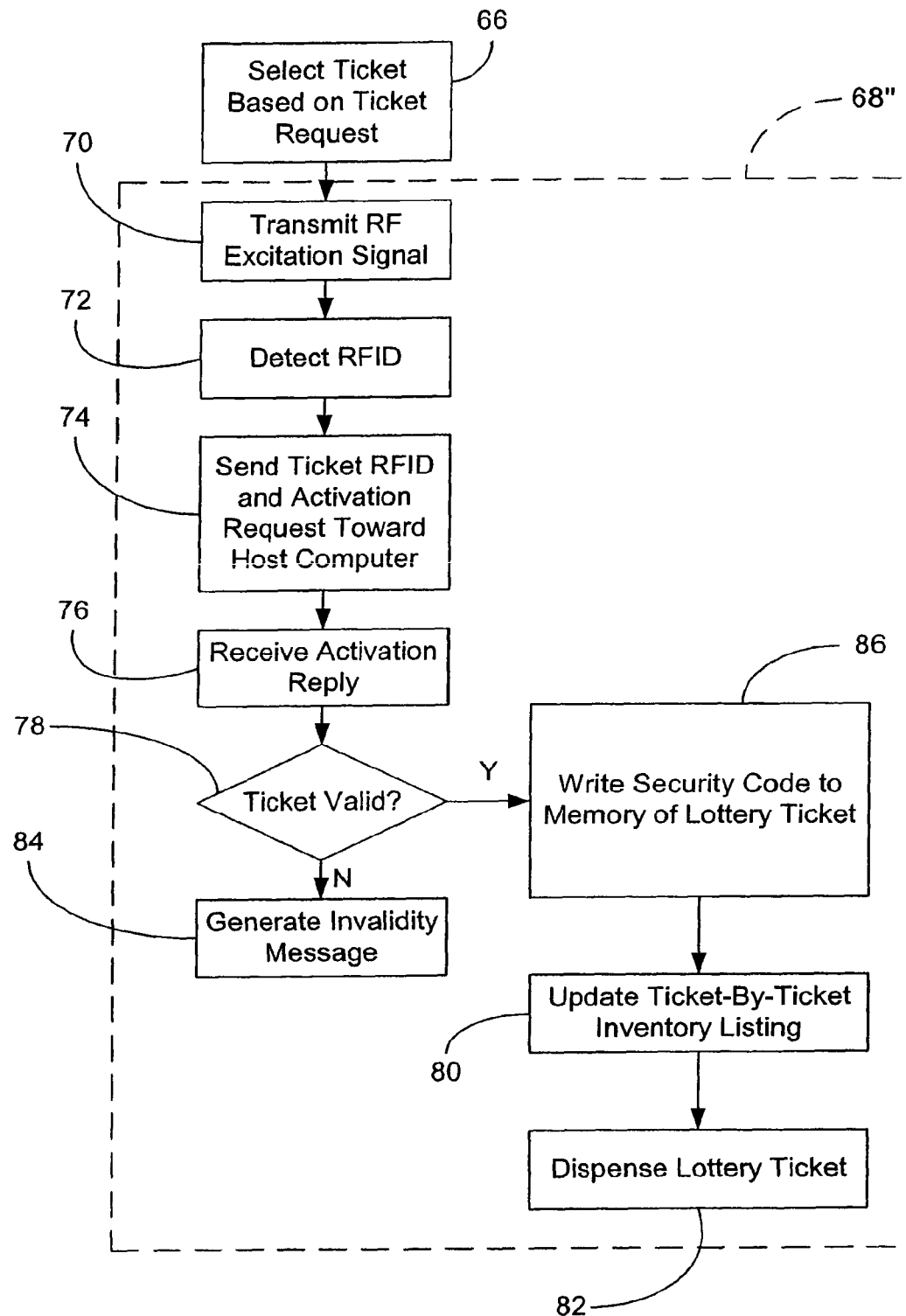
FIG. 5B is a flowchart of an example of a process of activating a ticket RFID according to an alternative embodiment of the invention.

FIG. 5B shows an alternative approach to activating the game ticket based on the ticket RFID at processing block 68". Block 68" is identical to the process shown in block 68' (FIG. 5A), with the exception that a security code is written to the memory of the game ticket at block 86 if the activation reply indicates that the game ticket is valid. The security code can include additional information such as the ticket value 58 (FIG. 10B) and activation status 60 (FIG. 10B) and enables redemption of the game ticket to take place locally at the RFID lottery system. Thus, the activation reply may further indicate whether the game ticket has been activated (e.g., activation status) and whether the game ticket is a winning ticket (e.g., ticket value). It should be noted that the security code can be generated partially or entirely by either the host computer or the RFID gaming system, where generation of the security code is merely dependent upon the activation reply indicating that the game ticket is valid.

Turning now to FIG. 6, a method 88 of validating game tickets is shown. The method 88 may be implemented by an RFID gaming system as a set of instructions capable of being executed by a processor to achieve game ticket validation. The instructions can be written using any number of well-known software programming techniques and can be stored in a wide variety of machine-readable media, such as EEPROM, CD-ROM, DRAM, etc. Generally, processing block 90 provides for receiving a validation request, where the validation request may be input by a consumer or retailer employee via any commercially available interface. The validation request may also be implied from the game ticket being held within reading distance of an RFID reader. A ticket RFID is read from the memory of the game ticket at block 92 based on the validation request, where the ticket RFID defines a validation code corresponding to the game ticket.

Figures 7A, 7B:
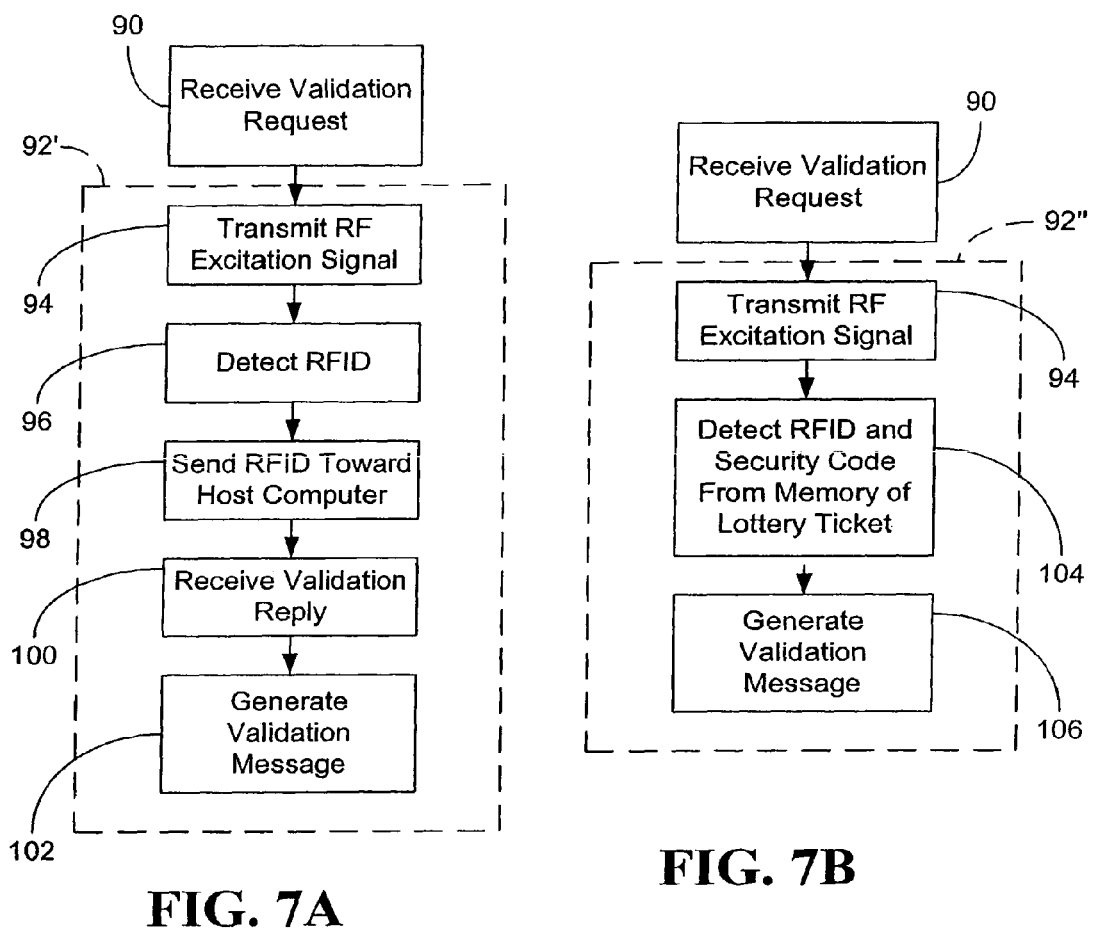
FIG. 7A is a flowchart of an example of a process of reading a ticket RFID from a memory of a game ticket according to one embodiment of the invention.
FIG. 7B is a flowchart of an example of a process of reading a ticket RFID from a memory of a game ticket according to an alternative embodiment of the invention.

FIG. 7A shows one approach to reading the ticket RFID in greater detail at block 92'. Specifically, block 94 provides for transmitting an RF excitation signal, where the excitation signal causes the game ticket to transmit the ticket RFID and block 96 provides for detecting the transmitted RFID. Information contained in the ticket RFID is sent toward the host computer at block 98 and a validation reply to the ticket RFID is received at block 100. Block 102 provides for generating a validation message such as "$100 Redemption Authorized" based on the validation reply.

FIG. 7B shows an alternative approach to reading the ticket RFID at processing block 92". Specifically, an RF excitation signal is transmitted at block 94 as already discussed. The transmitted RFID, which includes a security code, is detected at block 104. The security code may include information such as the ticket value 58 (FIG. 10B) and activation status 60 (FIG. 10B), where the security code was written to the memory of the game ticket at the time of activation and dispensing to the consumer. Thus, if the game ticket was obtained unlawfully and outside the standard activation and dispensing process, the security code will not be included in the ticket RFID and validation cannot be completed. Furthermore, such an approach enables local validation of the game ticket without the need for communication between the RFID gaming system and the host computer. It should be noted that although the approach shown in block 92" may eliminate the need for communicating the validation information back to the host computer at the time of validation, it may be desirable to send the validation information to the host computer at a later time in a cumulative report such as a monthly accounting report. In any event, block 106 provides for generating a validation message based on the security code.

Figure 8:
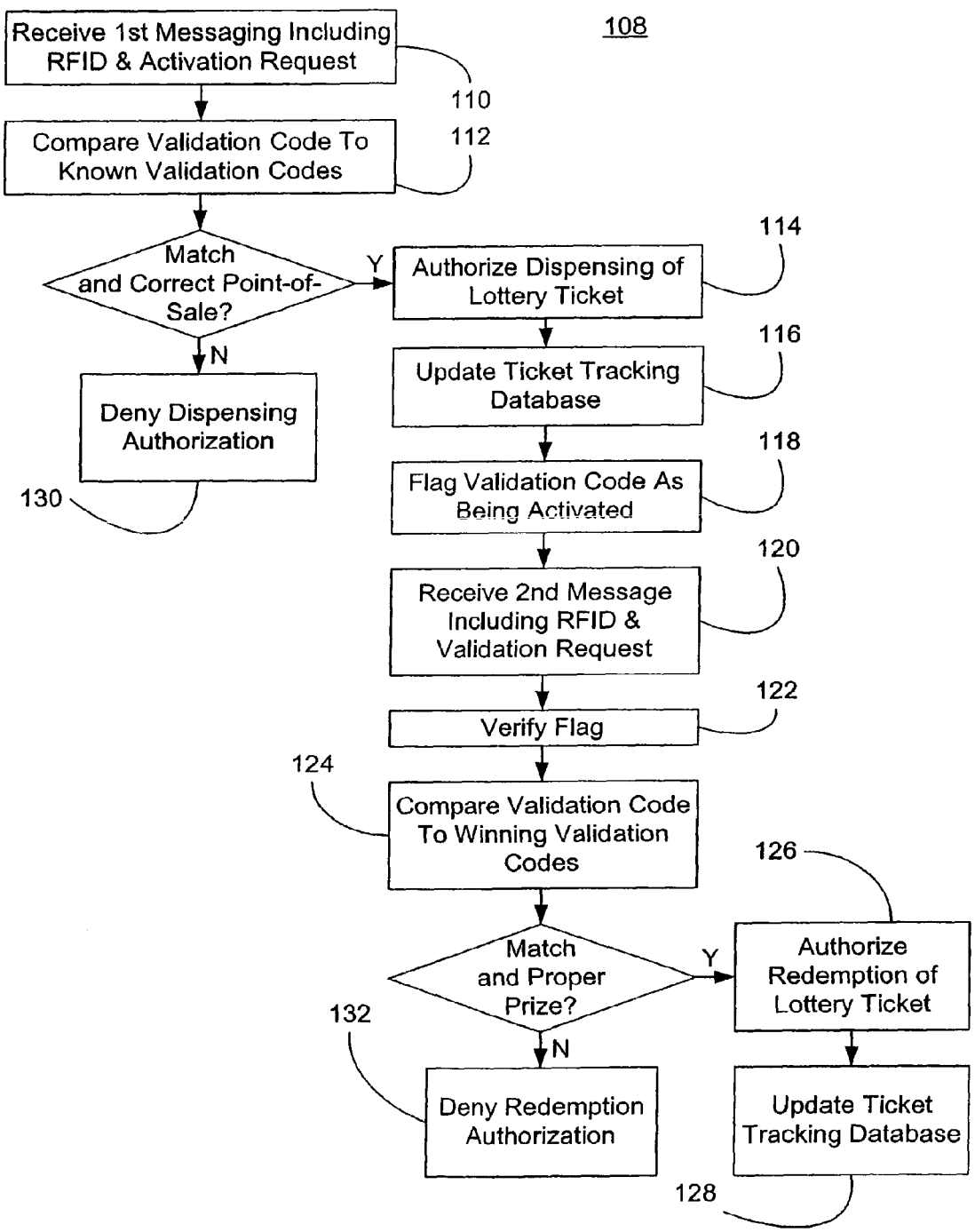
FIG. 8 is a flowchart of an example of a method of managing a game ticketing system according to one embodiment of the invention.

Turning now to FIG. 8, a method 108 of managing a gaming system such as a lottery ticketing system is shown. Method 108 can be implemented in a host computer as a set of instructions capable of being executed by a processor to manage one or more lottery systems. The instructions can be written using any number of well-known software programming techniques and can be stored in a wide variety of machine readable media. Generally, a first message including information contained in a ticket RFID and an activation request is received at block 110. The information contained in ticket RFID defines a validation code of a lottery ticket. Block 112 provides for comparing the validation code to a list of known validation codes. If the validation code matches a known validation code and the activation request defines a correct point-of-sale based on the known validation code, dispensing of the lottery ticket to the consumer is authorized at block 114. In addition, a ticket tracking database is updated based on the first message at block 116. Block 118 provides for flagging the validation code as being activated. A second message including information contained in the ticket RFID and a validation request is received at block 120, and block 122 provides for verifying that the validation code has been flagged as being activated. Block 124 provides for comparing the validation code to a list of winning validation codes. If the validation code matches one of the winning validation codes and the validation request defines a proper prize based on the winning validation code, redemption of the lottery ticket is authorized at block 126. In addition, the ticket tracking database is updated at block 128 based on the second message. If the validation code does not match one or more of the known validation codes, or if the activation request does not define a correct point-of-sale based on the known validation code, activation and dispensing authorization is denied at block 130. If the validation code does not match one or more of the winning validation codes, or if the validation request does not define a proper prize, redemption authorization is denied at block 132.

Thus, the use of RFIDs in gaming systems provides a unique and robust approach to addressing the shortcomings associated with conventional systems. Furthermore, as the cost of RFID tags and related technology continues to decrease, the use of the techniques described herein will become even more popular. For example, RFID lottery tickets would provide a very low cost solution for ticket-by-ticket vending machines. This is particularly true considering the cost associated with installing bar code scanners in every bin of a vending machine.

Those skilled in the art can appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A method of dispensing game tickets, wherein the game ticket comprises a radio frequency identifier (RFID), comprising:
   receiving a ticket request;
   selecting a game ticket based on the ticket request;
   sending an activation code contained in the ticket RFID to a host computer; and
   activating the game ticket based on the activation code from the RFID.

2. The method of claim 1 further including: receiving an activation reply, including a validation code; and dispensing the game ticket if the activation reply indicates that the game ticket is valid.

3. The method of claim 2 further including updating a ticket-by-ticket inventory listing if the game ticket is dispensed.

4. The method of claim 3, wherein the activation reply includes a security code which indicates whether the game ticket has been activated and whether the game ticket is a winning ticket, the method further including writing the security code to the memory of the lottery ticket.

5. The method of claim 3, further including: transmitting an excitation signal, the excitation signal to cause the game ticket to transmit the ticket RFID; and detecting the transmitted RFID.

6. The method of claim 3, wherein the validation code includes a batch number and a ticket number corresponding to the game ticket.

7. The method of claim 1, wherein the game ticket is a lottery ticket.

8. The method of claim 7, wherein the lottery ticket is an instant lottery ticket.

9. The method of claim 7, wherein the lottery ticket is a future draw lottery ticket.

10. A method of activating a game ticket comprising:
    transmitting a radio frequency excitation signal to a game ticket, wherein the game ticket comprises a radio frequency identifier (RFID) containing an activation request and wherein the excitation signal causes the game ticket to transmit the ticket RFID;
    detecting the game ticket RFID;
    sending the game ticket RFID an activation request to a host computer;
    activating the ticket.

11. The method of claim 10, wherein the game ticket RFID comprises a validation code.

12. The method of claim 10, further comprising the step of validating the game ticket.

13. The method of claim 10, further comprising the step of:
    updating a ticket-by-ticket inventory listing if the game ticket is activated.

* * * * *